(12) United States Patent
Pedone

(10) Patent No.: US 6,393,793 B1
(45) Date of Patent: May 28, 2002

(54) BEAM END FITTING AND A METHOD FOR REALIZING JOINTS FOR WOODEN BEAMS

(76) Inventor: Potito Pedone, Frazione S. Bernardo, 63-12040 Monteu Roero (IT)

(*) Notice: Subject to any disclaimer, the term of this patent is extended or adjusted under 35 U.S.C. 154(b) by 0 days.

(21) Appl. No.: 09/499,016

(22) Filed: Feb. 4, 2000

Related U.S. Application Data

(63) Continuation of application No. PCT/EP98/04935, filed on Jul. 31, 1998.

(30) Foreign Application Priority Data

Aug. 5, 1997 (IT) .......................................... T097A0716

(51) Int. Cl.[7] ............................................... E04H 12/00
(52) U.S. Cl. .................... 52/655.1; 52/653.1; 52/726.2; 52/656.9; 52/81.3; 403/287; 403/19; 403/267; 403/265
(58) Field of Search ............................. 52/653.1, 726.2, 52/655.1, 656.9, 81.1, 81.2, 81.3; 403/265, 267, 268, 270, 335, 336, 360, 287, 19

(56) References Cited

U.S. PATENT DOCUMENTS 4,475,841 A  10/1984  Eberlein ...................... 403/287

FOREIGN PATENT DOCUMENTS

| EP | 004057 | 1/1982 |
| EP | 0651099 | 5/1995 |
| EP | 0685609 | 6/1995 |
| FR | 1442413 | 5/1966 |
| WO | WO 96/21778 | 7/1996 |

Primary Examiner—Carl D. Friedman
Assistant Examiner—Patrick J. Chavez

(57) ABSTRACT

The invention concerns a beam end fitting and method for joining together wooden beams, the fitting comprising a tubular member adapted to be firmly secured by gluing inside a hole drilled in at least one of the two ends of a wooden beam, and connecting means for connecting the beams to each other, either directly or by an interposed core fitting, wherein said end fitting is provided with blocking means for blocking the end fitting inside the beam during the gluing step.

9 Claims, 2 Drawing Sheets

BEAM END FITTING AND A METHOD FOR REALIZING JOINTS FOR WOODEN BEAMS

This application is a continuation of PCT/EP98/04935 filed Jul. 31, 1998.

TECHNICAL FIELD

The present invention relates to an end fitting for realizing joints for wooden beams as well as a method for realizing such joints.

More particularly the invention concerns a metal end fitting or member for realizing truss joints of wooden beams adapted to build tridimensional trusses, and a method for accomplishing such joints.

BACKGROUND ART

When building tridimensional truss structures for roofing various kind of buildings such as gyms, conference rooms, show-rooms, swimming pools, etc., there are generally employed steel beams joined together by weldings formed in the field during the structure assembly.

Further to such kind of buildings, more recently there has been a spreading of wood use in form of laminar wood beams, for the roofing of both areas and buildings having an architectural relevance, where a particular importance is attached to the aesthetic appearance or harmony.

A problem in building wooden truss structures resides in the difficulty of firmly joining the beams to each other by using connectors allowing the proper orientation of the beams.

In the years several solutions have been suggested to solve the problem of forming joints among wooden beams that are adapted to build tridimensional truss structures.

In accordance with a first solution, metal plates are secured by pins or screws to the beam end for the connection of the beam to another one.

According to this solution the beam is thus clamped between two metal plates.

An alternative solution provides for inserting the plates into slots milled at the ends of the beams and fastening them by means of steel bolts.

Relying on this system in 1988 the roofing of the Oguni gym on mount Aso in Japan was built.

According to a second solution, metal tubular end members are inserted into longitudinal holes drilled at the ends of the beams.

Such metal tubular end members are further provided at the end protruding from the beam, with means adapted to allow the joining of a beam to another either directly or through a polygonal member called core fitting, adapted to receive a plurality of such end fittings.

These metal tubular end fittings are generally secured to the wooden beams through a plurality of radial pins crossing the beam sides and the tubular end fitting.

A drawback when using the above illustrated methods providing for pins or bolts comes from the weakening of the fibrous structure of the wood beam caused by the presence of the steel bolts or the radial pins since the beams are cut so as to have the wood natural fibers parallel to the beam longitudinal axis to take advantage of the beam resistance to traction and bending.

When the structure is subjected to stresses, the transversely extending bolts fastening the plates tend to spread apart the wood fibers thus reducing the connection strength and therefore requiring the use of large size bolts and beams that raises the weight and the costs of the structure.

A not negligible drawback of these known methods derives from their long execution times because radial holes are to be drilled and suitable pins, or bolts are to be properly positioned to realize the joint between the beams.

Several methods have been suggested to build trusses that overcome these drawbacks.

One of such methods is disclosed in EP-A-0 651 099. According to the teaching of this European Patent Application a joint for connecting together beams for building tridimensional truss structures comprises a core fitting provided with a plurality of metal tubes each preset to be inserted and stuck to a hole drilled at the ends of each wooden beam.

The metal tube is glued to the beam by injecting a resin into a channel provided in the tube, after the tube has been inserted into the hole drilled at the beam end.

The injected resin issues from the tube end that is inserted in the beam and fills the gap or clearance existing between the hole and the metal tube, and leaks outside the hole housing the metal tube.

Although this method does not require a fastening through bolts, thus avoiding the drawbacks of the prior art, it has other drawbacks that render its accomplishment quite difficult.

A drawback of the system disclosed in EP-A-0 651 099 is due to the fact that the glueing between the metal tubes and the wooden beams must preferably be carried out after the structure has already been assembled.

Since the resin has to be injected after the structure has been assembled, the workers have to operate under unfavorable circumstances with the structure being subjected to forces and movements that reduce the glueing efficiency.

Moreover, in order to carry out the glueing operation the diameter of the hole drilled in the beam must be slightly larger that that of the metal tube, so that a sufficient amount of resin can be spread between the metal tube and the beam. For this reason during the assembling of the structure slight relative movements can occur between the metal tube and the beam and such movements can endanger a correct glueing.

A further drawback of the system described in the above patent application derives from the fact that a large amount of resin is wasted to fill the injection channel provided inside the tube.

Therefore the tube to be inserted into the beam must be equipped with a small-size resin injecting channel which in turn will increase the mass of the tube that will be substantially solid and provided with a thin injection channel.

OBJECT OF THE INVENTION

A first object of the present invention is to provide an end fitting for realizing joints for wooden beams that is devoid of the drawbacks of the above illustrated prior art.

This object of the present invention is accomplished through an end fitting for wooden beams as claimed in claims from 1 to 6.

A second object of the present invention is to provide a method for realizing joints in wooden beams quickly and at low cost.

This object of the present invention is accomplished through a method for realizing joints in wooden beams as claimed in claims 7 to 9.

The end fitting of the present invention comprises a tubular member to be inserted into a longitudinal hole drilled at the end of a beam made of laminar wood.

Advantageously such end fitting comprises a tranverse plate provided with means for centering and blocking the fitting while the resin solidifies.

The tubular member is further provided with an outer surface. that is threaded, embossed or machined so as to increase the surface in contact with the resin.

The joint for connecting together two or more beams is obtained by glueing the body of the end fitting into the beam hole that has been filled in advance with a proper amount of resin.

After curing, the resin encircles the end fitting body for its whole length that has been inserted into the beam and transfer the forces generated at the structure panel points parallely to the wood fibers, thus increasing the joint strength.

Additional characteristics and advantages of the invention will become evident from the following description of a preferred and not-exclusive embodiment thereof illustrated in the attached drawings in which:

DETAILED DESCRIPTION OF PREFERRED EMBODIMENTS

Figure 1:
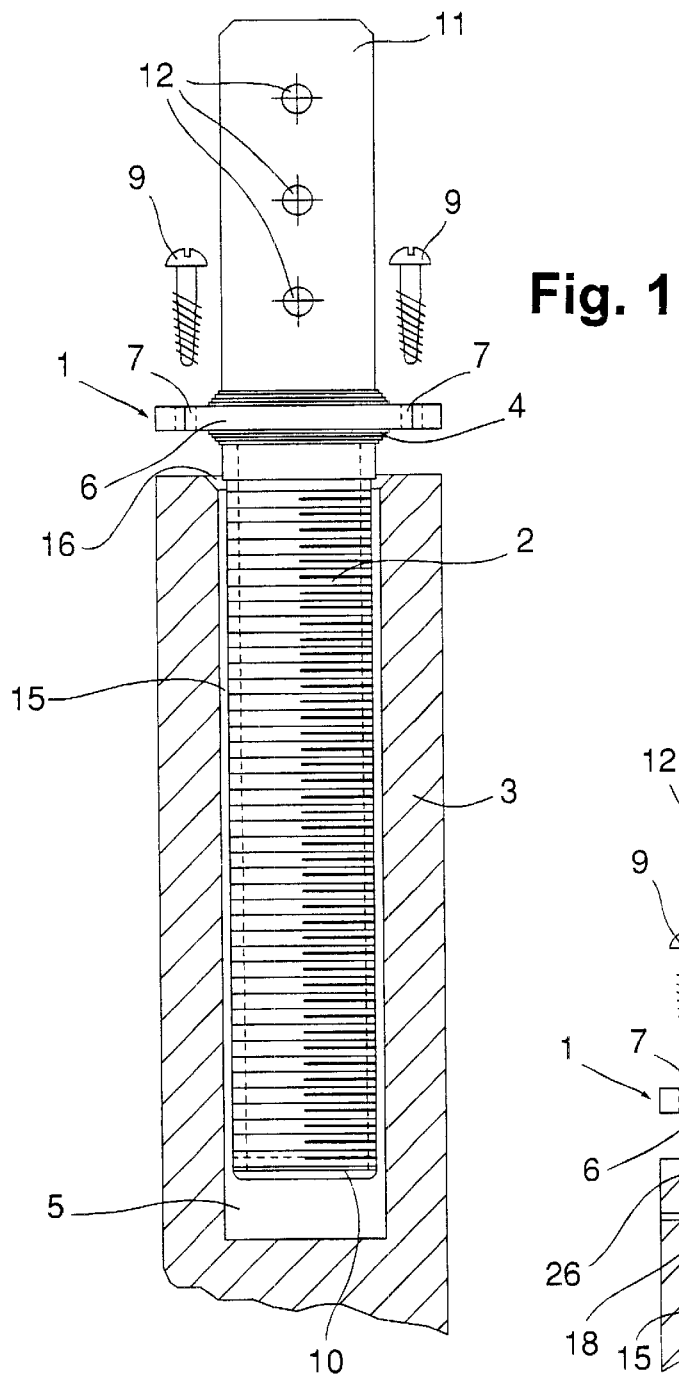
FIG. 1 is a cross section view showing the end portion of a wooden beam into which an end fitting according to the invention has been partially inserted.

With reference to the attached Figures, an end fitting 1 according to the invention comprises a tubular member or body 2 to be inserted into a hole drilled in a beam and glued thereto, a connecting member 11 and a transverse plate 6. The tubular member 2 has an outer surface that is threaded, embossed or machined so as to increase the surface to be contacted by the material used in glueing the end fitting to the beam.

The tubular member 2 is inserted into a longitudinal hole 5 with a flat bottom drilled in a laminar wood beam to form a joint or connector for two or more beams.

A plate 6 provided with holes 7 for fastening and centering the end fitting 1 to the beam 3 during the glueing thereof is transversely welded at one end of the tubular member 2. Plate 6 is preferably secured to the end of the beam 3 by means of screws 9 entering said holes 7.

The fastening of the end fitting 1 to the beam 3 by means of screws 9 has two purposes. Firstly it applies a pressure when the volume of the glueing material increases during the drying process whereby the glueing material uniformly fills the clearance between the tubular member and the wooden beam without driving the tubular member 2 out of the hole 5. Secondly it properly positions the end fitting 1 for the subsequent connection of such fitting with other joints or truss panel points, particularly when the joints are provided with flat connecting members such as a pair of parallel and spaced apart plates 11, as illustrated in the disclosed example.

Since the plate 6 is in contact with the end of the wooden beam, it allows a distribution of the stresses applied to the panel point thus increasing its strength by distributing the forces acting on the panel point.

Moreover, thanks to the plate 6, it is possible to accomplish a uniform glueing between the end fitting and the beam.

To the plate 6, on the side opposed to the tubular member 2, a pair of longitudinal and parallel plates 11 are welded, each plate being provided with holes 12 for the connection to a core fitting 13 for the formation of a truss structure.

The other end of the tubular member 2 is forcibly closed by a plug 10 of plastic material. As an alternative such end can be closed through the welding of a metal plug.

The diameter of the hole 5 in beam 3 is slightly larger than the outer diameter of the tubular member 2, so as to form between the inner wall of hole 5 and the tubular member 2 a gap or clearance 15 adapted to receive an amount of resin for glueing the end fitting 1 to the beam 3.

In order to allow a precise axial alignment of the end fitting 1 with the beam 3, at the entrance of the hole 5 there is formed a flaring or countersink 16 for receiving a tapered or frustum portion 4 formed between the plate 6 and the tubular member 2.

Advantageously said tapered portion 4 is directly formed upon welding together the plate 6 and the tubular member 2 so as to ensure the centering of the tubular member 2 inside the hole 5 and the escape of the air trapped within the clearance 15, thanks to the unevenness of the welding.

In the embodiment illustrated in the attached Figures, the plate 6 has a thickness of about 10 mm, for a 460 mm long end fitting 1 having a diameter of the tubular member 2 of 58 mm.

Again with reference to the illustrated embodiment the hole 5 has a diameter of 60 mm and a depth of 305 mm for a depth of the tubular member 2 of 300 mm.

The resin is chosen in the wide variety of commercially available resins for wood-metal couplings.

A resin used for such glueing is a two-component epoxy resin. This type of resin shows marked adhesion characteristics suitable for obtaining large size joints that are to withstand very large stresses.

The volume increase of the epoxy resin upon curing is small, thus allowing for a precise metering of the resin and the curing time is relatively short, about 2 hours, although it is advisable to allow a week for a complete drying before using the beam for building a truss structure.

On the other hand this type of resin is more expensive than other types of resins, and moreover, because of the short reaction time between the resin and the catalyst, it can be worked only by small amounts so that a limited number of glueings can be accomplished for each resin-catalyst mixture.

As an alternative a single-component polyurethane resin can be used for glueing the tubular member of the end fitting.

This resin is cheaper than the epoxy resins and does not require a catalyst so that the curing time is relatively long and allows to work larger amounts of resin for assembling a large number of joints.

Test have been carried out and showed that on the average a single-component polyurethane resin kept at 20° C. is completely dried and cured after a week.

Further, the single-component polyurethane resin has a tendency to considerably increase its volume and to completely fill the clearances between the tubular members and the beam holes, and also to enter the gaps between the wood fibers, thus realizing a strong fixing of the tubular member into the hole, thanks to the resin expansion within the clearance.

Figure 4:
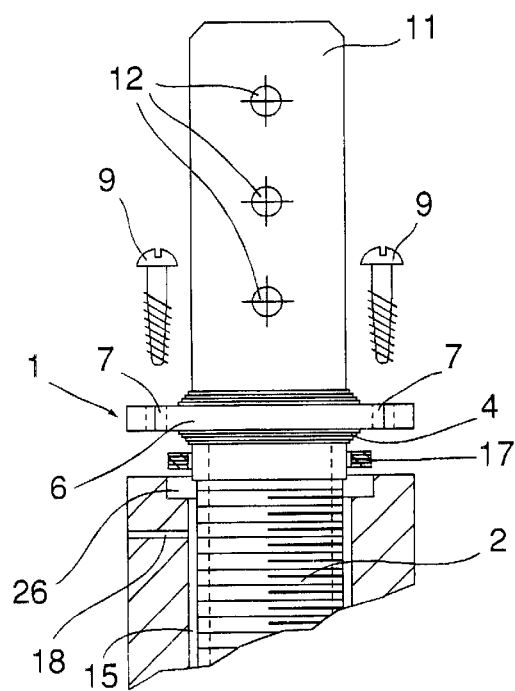
FIG. 4 shows an embodiment of the invention provided with a sealing gasket.
Figure 2:
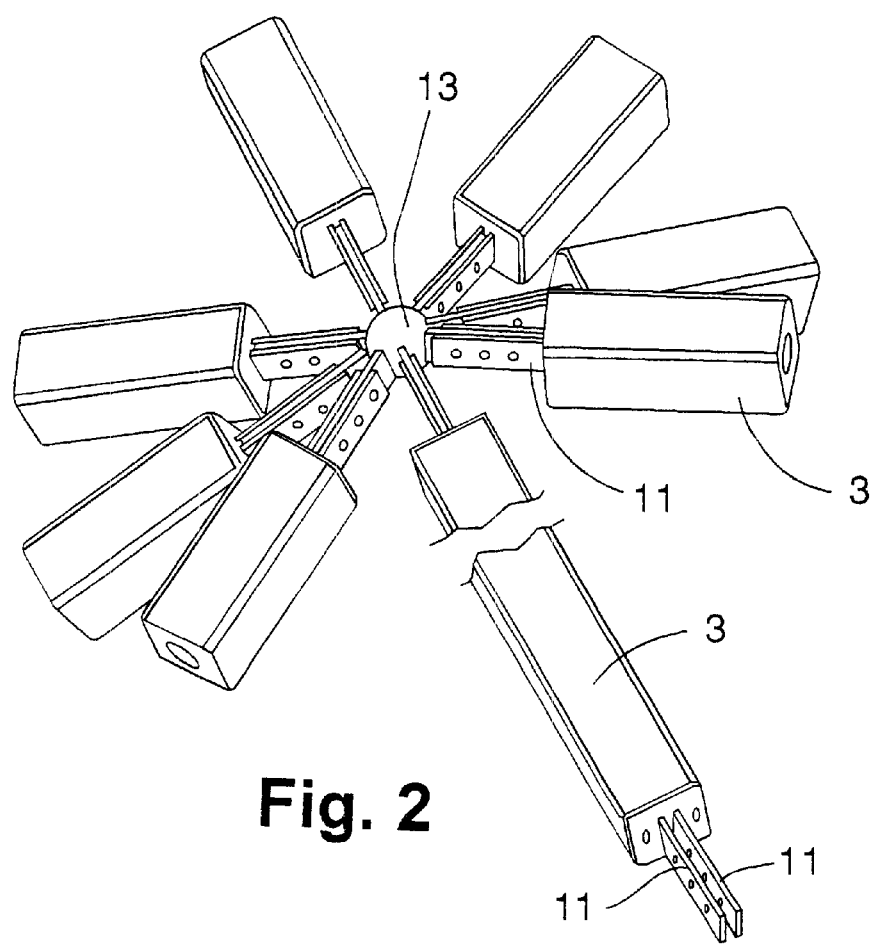
FIG. 2 is a perspective view of a plurality of beams joined to each other at a truss panel point or knot.
Figure 3:
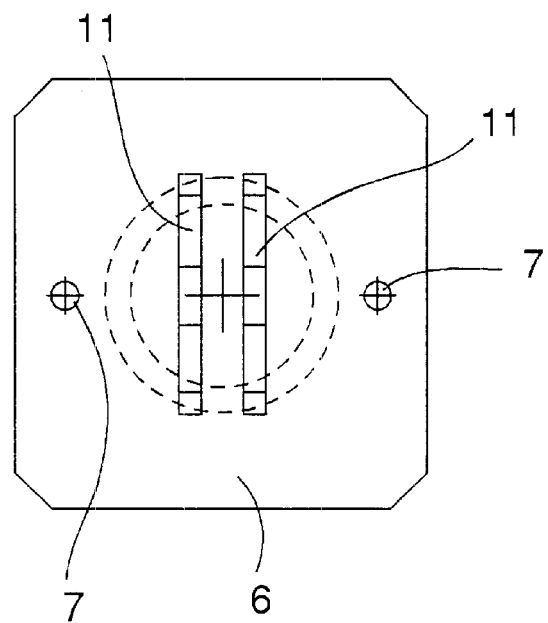
FIG. 3 is a plan view of an end fitting according to the invention.

With reference to FIG. 4, particularly when a single-component polyurethane resin is used, it will be of advantage to provide for a ring sealing gasket 17 to be interposed between the tapered edge 4 and a cylindrical flaring 26 at the outer end of the hole 5 for receiving the sealing gasket 17.

Therefore the gasket 17 has the purpose of definitively sealing the hole 5 after the blocking of the end fitting 1 to the beam 3 has been accomplished through the screws 9.

For allowing the issuing of the excess resin and of the air trapped within the single-component polyurethane resin, it can be of advantage to provide a small diameter transverse hole 18 drilled near the outer end of hole 5.

The method for connecting together wooden beams according to the invention provides for a first step in which at least in one end of a laminar wood beam a longitudinal dead hole is drilled, a second step in which said hole is partially filled with an amount of resin sufficient to fill the clearance defined between the hole and a metal tubular member when this latter is positioned into the hole, a third step in which the tubular member is inserted into the hole and pressed until the excess resin issues from the hole, a fourth step of blocking the tubular member inside the hole, and a fifth drying step carried out in air in accordance with the type of resin being used.

When the resin is of the single-component polyurethane resin type, before the filling step it can. be of advantage to provide a step in which the surface of said hole is moistened to improve the set of the resin.

Industrial Applicability

The invention is applicable in realizing joints for wooden beams to build tridimensional trusses.

What is claimed is:

1. A beam end fitting for realizing joints for wooden beams comprising a tubular member adapted to be inserted into a hole drilled in at least one end of a wooden beam and fastened thereto by gluing, and means for connecting together said beams either directly or through an interposed core fitting, characterized in that said core fitting is provided with blocking means for blocking said core fitting within said beam during said gluing, said blocking means comprises a plate transversely disposed between said tubular member and said connecting means, said plate being provided with at least two holes for the passage of as many screws adapted to firmly secure said plate to the end of said beam.

2. A beam end fitting as claimed in claim 1, characterized in that the end of said tubular member inserted in said hole is closed by a plastic material plug.

3. A beam end fitting as claimed in claim 1, characterized in that said tubular member comprises an outer surface that is threaded, embossed or machined so as to increase the surface to be contacted by the material used for said gluing.

4. A beam end fitting as claimed in claim 1, characterized in that it comprises, in the portion between said plate and said tubular member, a tapered portion adapted to be received in a corresponding countersink at the entrance of said hole.

5. A beam end fitting as claimed in claim 1, characterized in that said connecting means comprises a pair of longitudinal parallel plates provided with holes for the connection to a core fitting adapted to receive a plurality of said end fittings.

6. A beam end fitting as claimed in claim 1, characterized in that said gluing is achieved through a single-component polyurethane resin.

7. A method for connecting together wooden beams by means of beam end fittings inserted into holes drilled in at least one end of each of said beams and glued thereto to realize joints of wooden beams, characterized in that for each of said beam ends it comprised the steps of:

partially filling with a proper amount of resin said hole drilled in the beam end;

inserting into said hole a portion of said end fitting corresponding to a tubular member adapted to be firmly secured through gluing inside said hole;

pressing said tubular member into said hole until the excess of resin and the air in the clearance defined between said hole and tubular member have been driven out;

blocking said end fitting in said hole during the gluing; and drying the resin until it has completely cured;

wherein said blocking means comprising a plate transversely disposed between said tubular member and said connecting means, said plate being provided with at least two holes for the passage of as many screws adapted to firmly secure said plate to the end of said beam.

8. A method as claimed in claim 7, characterized in that it comprises the step of moistening the inner surface of said hole before inserting said tubular member into said hole.

9. A method as claimed in claim 7, wherein said resin is a single-component polyurethane resin.

* * * * *